Dec. 12, 1933.        C. SCHMITTHENNER        1,939,229
TURBINE CONSTRUCTION
Filed Feb. 9, 1931        2 Sheets-Sheet 1
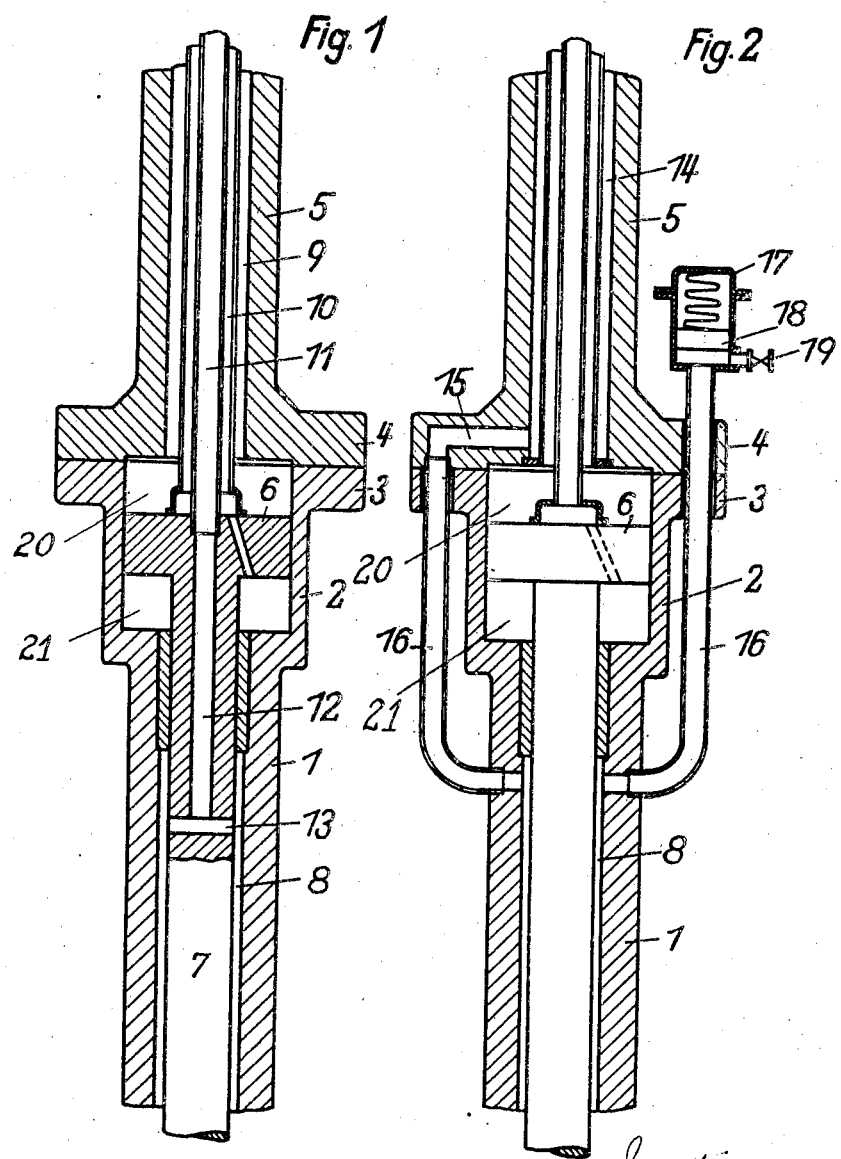

Dec. 12, 1933.  C. SCHMITTHENNER  1,939,229
TURBINE CONSTRUCTION
Filed Feb. 9, 1931  2 Sheets-Sheet 2

INVENTOR
Carlos Schmitthenner
BY C. P. Goepel
his ATTORNEY

Patented Dec. 12, 1933

1,939,229

UNITED STATES PATENT OFFICE 1,939,229

TURBINE CONSTRUCTION

Carlos Schmitthenner, Heidenheim-on-the-Brenz, Germany

Application February 9, 1931, Serial No. 514,379, and in Germany February 14, 1930

6 Claims. (Cl. 253—117)

This invention relates to hydraulic turbines, pumps and similar apparatus with movable vanes, and is concerned with the prevention of entry of water into the runner head.

In hydraulic turbines, pumps and similar apparatus with movable vanes the runner head is filled with oil. In order to prevent the entry into the oil space in the hub of water which flows past, and which is also under pressure, packing devices are inserted at flanges of the runner blades. Should the water pressure on the outside be noticeably higher than that of the oil on the inside, then it is impossible to prevent even the best packing devices from gradually allowing water to enter the oil. This entry of water is exceptionally serious, since the trunnions and links of the governing mechanism for the runner blades would soon fail due to poor lubrication.

In those arrangements where the runner servo-motor is fitted into the runner head, and the governor oil pressure is used at the same time for lubricating the control devices, it is well known that the discharge of the oil pressure takes place at the upper end of the generator or motor shaft. The disadvantage of this arrangement is however, that in place of using a thick viscous and cheap lubricating oil, the thin expensive governor oil must be used.

In the other arrangements with separate oil intake for governing and lubricating purposes, it was usual to place the filling hole for the oil at the highest point of the circular oil pipe below the servo-motor. Since however, it is now usual to have the runner servo-motor included between the flanged couplings, between the turbine and the generator, or alternatively between the pump and the motor shaft, there is usually only a small head for the oil available. This disadvantage can be overcome by the following invention.

This invention consists in having the oil pressure in the runner head higher than the water pressure on the blades of the turbine, pump or similar apparatus. The method of carrying this out, as for example with propeller type turbines, pumps, and similar apparatus with vertical shaft, is to raise the oil level up to the higher end of the coupled shafts, so that a servo-motor installed between the two shafts of the turbine and generator could have a central pipe, or annular channel which is either directly connected, or by means of by-pass pipes connected with the oil pipe in the turbine, or alternatively pump shaft, and passed through the hollow generator or alternatively motor shaft. Or again, it can be done by having an oil pressure accumulator in the oil supply pipes of the turbine, or alternatively the pump shaft.

In the accompanying drawings:—

Figure 1 represents a fragmentary sectional view of the turbine and the generator shafts, and of the servo-motor arranged between the flanges of such shafts, and showing in connection with these parts the piping connections for the two oil supply systems;

Fig. 2 is a view similar to Fig. 1, but showing a modification in the arrangement of the two oil supply systems.

Figure 3:
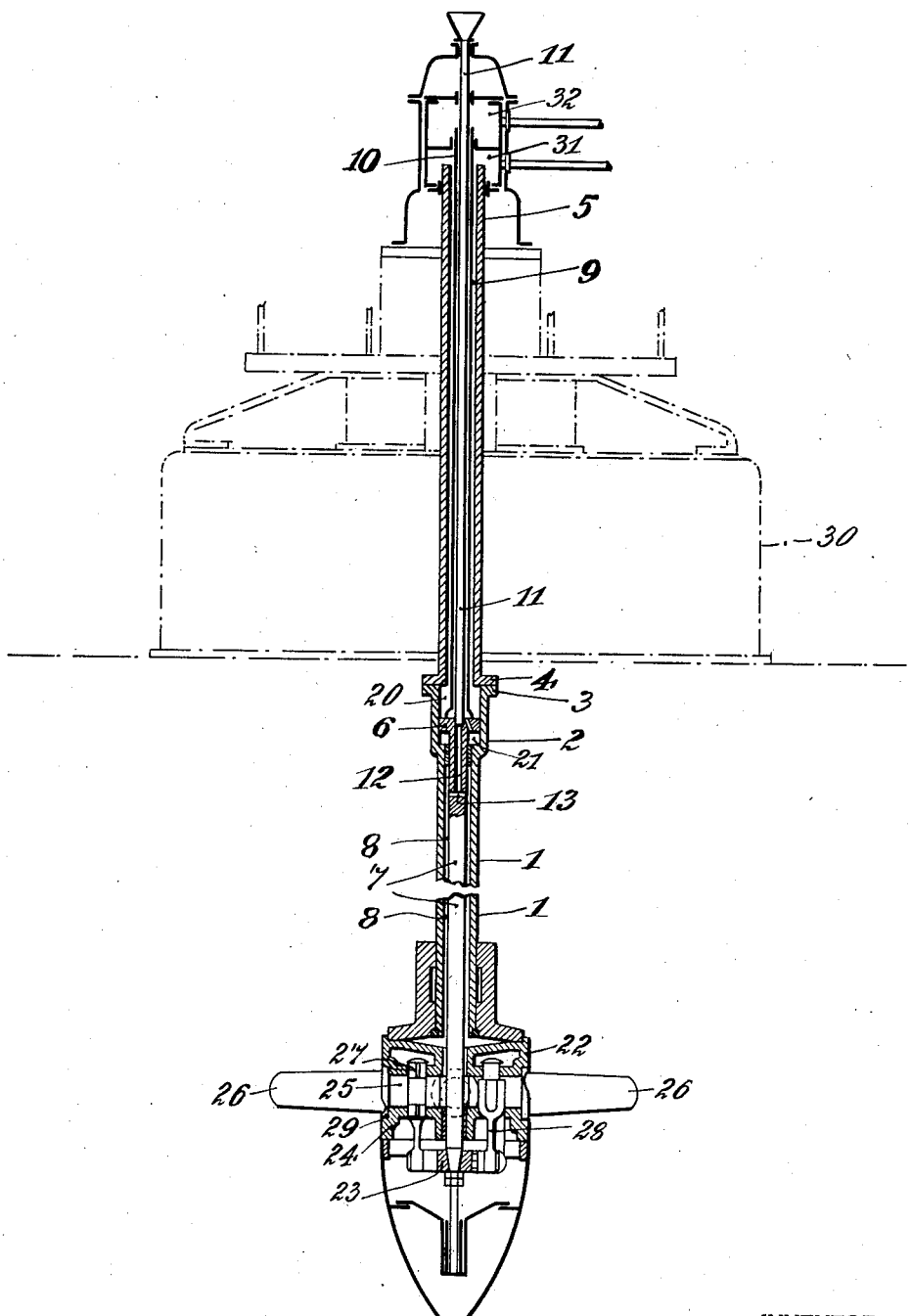
Fig. 3 represents an elevational view, more or less diagrammatical in character and partially in section, showing a propeller type turbine and a generator with oil supply heads in association with the shafts and oil supply system as illustrated in Fig. 1.

The hollow turbine shaft 1, widens in its upper end to the runner servo-motor 2. Opposite flange 4 of the generator or gear driven shaft 5, is the solid coupling for the turbine flange 3. The governor spindle 7 passes through the hollow turbine shaft and is moved by the servo-motor piston 6, which is rigidly joined thereto, this servo-motor piston being located in the enlarged portion 2 between the upper and lower oil pressure chambers 20 and 21. At its lower end, the hollow turbine shaft 1 is connected with the runner head or hub 22, while the spindle 7 within the hollow shaft 1 is connected adjacent its lower end to the usual cross head 23. Runner head 22 is provided with bushings 24 for the trunnions 25 of the runner blades or vanes 26. Rockable arms 27 and links 28 connect the trunnions with the cross head 23 on the spindle 7. Through these operating connections, the construction and arrangement of which are well-known in Voith Kaplan turbines, the servo-motor piston 6 serves as the means by which to control the angularity of the blades 26. At the outer portions of the bushings 24, the blades are made water tight by means of any suitable packing devices or seals 29 against which the pressure water flows by, the pressure depending on the head of the layout. In order to keep the oil pressure inside the runner head 22 higher than the water pressure on the blades 26 and seals 29, there is fitted between shaft 1 and the governor spindle 7, an annular pipe 8 for filling the oil into the runner hub, and into which oil can be poured from the top.

Referring now to Figs. 1 and 3, it will be seen that according to the present invention, I arrange two concentric pipes in the hollow shaft 5, of the generator 30 so as to form thereby three concentric oil supply channels. Annular channels 9 and 10, act as servo-motor supply pipes, while the innermost pipe 11, which reaches up to the highest point of the generator 30, takes care of the lubricating oil for the runner head. Pipe 11 terminates at a hole 12, in the governing spindle 7, which hole is joined furthermore to the annular oil pipe 8, by means of a cross boring 13.

With this arrangement, the heavy lubricating oil for the runner head is filled through the pipe 11, bore 12, cross bore 13 and pipe 8, the last-named opening at its lower end into the interior of the runner head. According to my invention, the runner head is completely filled with oil, as are also the passages 8, 13 and 12, and oil is maintained in the pipe 11 at such height as may be necessary to keep the oil pressure inside the runner head higher than the water pressure against the blades 26 and packing means 29. The pipe 11 reaches to the highest point of the generator 30 and it can be extended above the generator to any height that may be necessary in order to attain inside the runner head an oil pressure sufficient to prevent the entry of water into the runner head.

Thin governor oil is supplied from above to the servo-motor, the outer pipe 9 supplying the oil to the chamber 20 at the upper side of the piston, while the pipe 10 supplies the oil to the chamber 21 at the lower side of the piston. Suitable oil supply heads 31 and 32 are provided at the top of the generator for the pipes 9 and 10. The heads 31 and 32 receive their oil supply from a suitable oil governor system. It is pointed out that an advantage of this arrangement lies in the fact that an inexpensive heavy-bodied oil can be used to lubricate the working parts in the runner head and subjected to pressure sufficient to exclude the outside water, without interfering in any way with the use of a thin governor oil for operating the servo-motor.

In Fig. 2, left hand side, the annular space 14 is used as the riser pipe for the runner head, and this is connected by means of a boring 15, and a bye pass pipe 16, in an analogous manner, with the annular oil pipe 8. The method of operating is again exactly the same as the previous example quoted. In Fig. 2, right hand side, there is an oil accumulator 17, connected to pipe 16, through the annular oil pipe 8. The spring loaded piston of the accumulator is, from time to time when the turbine is stationary, raised by injecting oil under pressure through valve 19. That is to say, it is loaded again. By suitably choosing the spring, the oil is held under sufficient pressure to prevent the entry of water into the runner head under all circumstances.

What I claim is:

1. In combination with a blade type runner hub having a hollow vertical shaft containing a servo-motor and a spindle by which to regulate the blade of the runner hub, means for maintaining oil pressure inside the hub higher than the outside water pressure about the blade, comprising an oil supply pipe fitting between the spindle and shaft and feeding into the hub, a second supply pipe fitting into the spindle and extending vertically well above the servo-motor, and a bore in the spindle providing communication between the second supply pipe and the first supply pipe whereby to exert oil pressure within the hub by a sustained column of oil the height of which is above the servo-motor, and separate means for supplying oil under pressure to the servo-motor.

2. In a hydraulic machine having a runner hub with blades turning in bearings, a shaft connected with the hub so as to be driven thereby for communicating power from the hub, a servo-motor in the shaft having connection with the blades whereby to shift the same, passages provided in the shaft to opposite sides of said motor and affording a system for supplying thin governor oil for the operation of said motor, an additional passage provided in the shaft and extending into the hub for supplying heavy lubricating oil to the blade bearings, and means forming an upright extension to said additional passage for sustaining an upright column of the lubricating oil the weight of which within the hub and around the bearings is sufficient to maintain an oil pressure in excess of the water pressure around the blades outside the hub, said passage with extension being entirely independent of the passages for the governor oil.

3. In a hydraulic machine having a runner hub with blades turning in bearings, a shaft connected with the hub so as to be driven thereby for communicating power from the hub, a servo-motor in the shaft having connection with the blades whereby to shift the same, passages provided in the shaft to opposite sides of said motor and affording a system for supplying thin governor oil for the operation of said motor, an additional passage provided in the shaft and extending into the hub for supplying heavy lubricating oil to the blade bearings, and means associated with said additional passage for compelling therethrough the exertion within said hub and around the bearings of a lubricating oil pressure in excess of the water pressure around the blades outside the hub, said additional passage with associated means for furnishing lubricating oil being entirely independent of the passages for governor oil.

4. In a hydraulic machine having a runner hub with blades turning in bearings and having a servo-motor the operation of which imparts shifting motion to the blades, means comprising a system for supplying thin governor oil to said motor for controlling the operation of said motor by the action of the governor oil, a system for supplying heavy lubricating oil to the hub, a vertical shaft driven by the hub containing said motor and with which said systems are associated, said systems being independent of one another to prevent intermingling of the two kinds of oils, said heavy oil system including a conduit in the shaft supplying the oil downwardly and directly into the hub for effecting heavy oil pressure within the hub, and means acting on the oil of the conduit for maintaining the supplied oil within the hub at a pressure in excess of the water pressure around the blades and bearings outside the hub, said means being flexible to suit substantial variation in such water pressure.

5. In a hydraulic machine including a runner hub with blades movable in bearings, the combination with a hollow vertically disposed shaft connected at its lower end with the hub for transmitting power therefrom, of means within the hollow shaft for controlling the adjustment of the blades comprising a servo-motor having a spindle extending into the hub and connected with the blades, said spindle forming with the shaft below the servo-motor an oil pressure passage feeding into the hub, an oil supply system associated with the shaft for supplying thin governor oil for the operation of said motor, and a separate oil supply system associated with said shaft and connected with said oil pressure passage for supplying heavy lubricating oil to said passage and hence to the interior of said hub, said last-named system being effective to increase the pressure of the heavy lubricating oil within the hub to an extent sufficient to resist entrance of water from the outside of said hub around the bearings for the blades.

6. In a hydraulic machine including a runner hub having blades adjustable in bearings, the combination with a vertically disposed shaft connected at its lower end to the hub and driven thereby, of a servo-motor and a spindle connecting the same with said blades whereby to control the adjustment of the blades by the operation of the motor, said motor being arranged in a chamber in the shaft and said spindle extending through a conduit in the shaft feeding into the hub, an oil supply system associated with the shaft and connected with the motor chamber for supplying thereto governor oil for the operation of the motor, an oil supply system associated with the shaft and connected with said conduit for supplying heavy lubricating oil under pressure to said conduit for compelling through the latter the exertion within the hub and around the bearings of an oil pressure in excess of the water pressure around the blades outside the hub, and bearing means between said spindle and shaft for preventing the passage of oil between said conduit and motor chamber.

CARLOS SCHMITTHENNER.